United States Patent [19]
Kowalski

[11] Patent Number: 5,972,401
[45] Date of Patent: Oct. 26, 1999

[54] PROCESS FOR MANUFACTURING TASTELESS SUPER-PURIFIED SMOKE FOR TREATING SEAFOOD TO BE FROZEN AND THAWED

[76] Inventor: William R. Kowalski, 2161 Kalia Rd., No. 306, Honolulu, Hi. 96815

[21] Appl. No.: 08/980,392

[22] Filed: Nov. 28, 1997

Related U.S. Application Data

[63] Continuation-in-part of application No. 08/733,844, Oct. 18, 1996
[60] Provisional application No. 60/040,731, Mar. 12, 1997.

[51] Int. Cl.$^6$ .................................................... A23B 4/044
[52] U.S. Cl. .......................... 426/314; 426/478; 426/486; 426/524; 426/315
[58] Field of Search .................................... 426/314, 315, 426/478, 486, 524

[56] References Cited

U.S. PATENT DOCUMENTS

| | | |
|---|---|---|
| 889,828 | 6/1908 | Trescott . |
| 3,122,748 | 6/1959 | Beebe, Jr. . |
| 3,663,237 | 5/1972 | Moller . |
| 3,851,078 | 11/1974 | Khayat et al. . |
| 4,359,481 | 11/1982 | Smits et al. ............................. 426/533 |
| 4,522,835 | 6/1985 | Woodruff et al. . |
| 4,751,097 | 6/1988 | Melcer .................................... 426/650 |
| 5,484,619 | 1/1996 | Yamaoka et al. . |

FOREIGN PATENT DOCUMENTS

| | | |
|---|---|---|
| 1717058 | 8/1970 | Germany . |
| 3010473C1 | 5/1982 | Germany . |
| 3010473C2 | 2/1991 | Germany . |
| 4104953A1 | 5/1992 | Germany . |
| 097944 | 12/1984 | Japan . |
| 251682 | 5/1987 | Japan . |
| 047667 | 9/1988 | Japan . |
| 406292503 | 10/1994 | Japan . |
| 847973 | 7/1923 | U.S.S.R. . |
| 11778395 | 9/1985 | U.S.S.R. . |
| 1360609 | 7/1974 | United Kingdom . |

OTHER PUBLICATIONS

Iowa State University, "*Minimum Specifications For One Truck Laboratory Oven For Iowa State University*", Section I, 1988, p. 6.
The Kartridg Pak Co. flyer, "*There Is No Substitute For The Flavor Of Natural Wood Smoke*", 1989.
Smoke In Food Processing, Table 15, "*Odor And Taste Recognition Thresholds (ppm) And Most Desirable Concentrations (ppm) Of The Phenolic Fraction Isolated From The Vapor And Particualte Phases Of Wood Smoke*", p. 74.
"*Cured, Salted, and Smoked Fish Establishments Good Manufacturing Practices: An Association of Food and Drug Official Model Code Adopted Jun. 1991*", Section 5.4.
Andrade, et al., "*Technological Utilization of Mandi Fish: Cold Smoking*," English Abstract of Portuguese lecture, 1975.
PescaRich Global Marketing Corporation,"The PescaRich Process" brochure.

*Primary Examiner*—David Lacey
*Assistant Examiner*—Drew Becker
*Attorney, Agent, or Firm*—Martin E. Hsia

[57] ABSTRACT

Tasteless super-purified smoke is manufactured to treat seafood and meat to preserve the freshness, color, texture, and natural flavor, particularly after the food is frozen and thawed. The smoke is generated by burning an organic smoking material at preferably 500 to 800 degrees F. (260 to 571 degrees C.) in a smoke generator 1. It is then passed through a precipitation filtering tower 2 comprised of filters of ice, cloth, and activated carbon to remove taste imparting, and carcinogenic, particulates and vapors. The super-purified smoke is then stored and aged in a temporary pressure pot 3 or in canisters for treatment at the same time or at another place and time. The super-purified smoke is used to treat seafood or meat in plastic bags at temperatures between its variable freezing point and 46 degrees F. (7.8 degrees C.) for twelve to forty-eight hours, or until the desired effect is achieved. The product is then frozen, stored for up to one year, and quick or slow thawed with little degradation of the treated seafood or meat.

73 Claims, 3 Drawing Sheets

PROCESS FOR MANUFACTURING TASTELESS SUPER-PURIFIED SMOKE FOR TREATING SEAFOOD TO BE FROZEN AND THAWED

This application claims the benefit of U.S. Provisional Application No. 60/040,731 Mar. 12, 1997.

This application is a continuation-in-part of copending application number 08/733,844 filed on Oct. 18, 1996.

TECHNICAL FIELD

This invention relates to a process for manufacturing tasteless super-purified smoke for treating seafood to preserve the freshness, color, texture, natural flavor, moisture retention, and shelf life after the seafood is frozen and thawed. These characteristics are the vital signs of quality in seafood, hereinafter referred to as "vitality."

The super-purified smoke treatment process is effective in prolonging the vitality of fresh seafood. However, this invention is uniquely valuable in that the vitality preserving effects of the treatment process survive freezing and thawing. The primary seafood species to be treated is tuna and other seafood containing red color flesh that would tend to turn brown after being frozen and thawed without the treatment described herein. Although this tasteless super-purified smoke is primarily intended to be used to treat seafood, it can also be used with meat and poultry.

The intention of treatment with our tasteless super-purified smoke is to preserve the vitality of the seafood so it appears and tastes similar to fresh after it is frozen and thawed. In all cases seafood should be wholesome. However, seafood that is consumed uncooked for sashimi must be visually attractive in its raw form. The purpose of improving the aesthetic qualities is to create a seafood product which is visually suitable for sashimi after freezing and thawing. The result will be a sashimi quality seafood product delivered to the consumer equal to, or superior to, fresh seafood in regards to vitality, quality, safety, and convenience.

This invention further relates to an apparatus and process to manufacture tasteless super-purified smoke and subsequent processes to treat seafood with the manufactured smoke at the same time or at another place and time. The tasteless super-purified smoke can be stored at room temperature and transported in canisters simplifying the treatment steps and making them more convenient and affordable for various applications within the seafood industry. Two products can be generated with this invention:

1. The bottled tasteless super-purified smoke itself.
2. seafood (or other meat) treated and preferably frozen, and sold for resale after thawing.

For centuries, seafood served raw as sashimi has been a staple of the Japanese diet. The Japanese sashimi market draws the highest price among all seafood markets. Red color bluefin tuna meat with high oil content sometimes sells for over $100 per kilogram. This price is five to ten times higher than the price of lobster.

Tuna is the primary species consumed raw for sashimi. However, marlin, snapper, salmon, yellowtail, and other species are also eaten raw. The Japanese imports of tuna increased three times in quantity and five times in value from 1984 to 1993. The increase in value is directly associated with the increased demand for imported tuna needed to supply the Japanese sashimi market. At the same time the U.S. market for sashimi has expanded. The numbers of sushi bars, Japanese restaurants and American restaurants serving sashimi has increased dramatically over the past five years.

In Japan, the freshness of seafood has been preserved using super cold freezing temperatures below −76 degrees Fahrenheit (−60 degrees Centigrade) to freeze and to store the seafood before thawing and consuming. Holding sashimi tuna at these super low temperatures is very effective in maintaining the natural bright red color of the flesh for up to one year. However, this technology has not been useful in the U.S. because the seafood industry lacks the commercial infrastructure to maintain seafood below −76 degrees Fahrenheit (−60 degrees Centigrade). Thus, until now, the U.S. seafood industry has been limited to using only fresh seafood for sashimi.

Some disadvantages of fresh seafood for sashimi as opposed to frozen are:

1) Sashimi markets are widely distributed around the world, often very far from fishing resources. It is difficult to maintain peak freshness, color, and wholesomeness of fresh seafood because of time, exposure, and wear-and-tear suffered in delivering the fresh product through the various distribution channels to the consumer. This delivery process often takes five to eight days, during which time contamination and decomposition occurs. The present distribution process for fresh seafood compromises the quality of sashimi reaching the consumer.

2) There is an increasing concern among leading health authorities regarding the safety of consuming seafood raw because of possible parasite infestation. The presence of harmful parasites in raw seafood is evidenced by medical records reporting many cases of parasite infection. Responding to this concern, the U.S. Food and Drug Administration (F.D.A.) is supporting a legislative initiative requiring that tuna and other seafood be frozen before being served raw as sashimi, for the health and safety of the consumer.

According to the F.D.A., freezing the seafood at −4 degrees Fahrenheit (−20 degrees centigrade) or below for seven days kills parasites living in the flesh. However, freezing of tuna, the primary species for sashimi, turns the attractive bright red color to an ugly brown color after being thawed. The tuna will be safe to eat but it will not be acceptable for sashimi. In addition to the commercial importance of the sashimi market, the use of sashimi is as culturally important to the Japanese during the New Year season as turkey is to Americans at Thanksgiving. If a U.S.F.D.A. mandate is passed, it may impose commercial and cultural hardship unless new technologies are introduced to preserve the vitality of frozen and thawed seafood.

The bright red color of sashimi tuna meat is a key factor in determining quality. If a tuna is very fresh and wholesome, but lacks red color, then it has no value for sashimi. From an economic point of view, the value of the tuna is established based on the degree of redness in the flesh.

Implementing the Japanese method of super cold freezing (−76 degrees Fahrenheit or less) (−60 degrees Centigrade or less) and storage is impractical in the U.S. because of the retrofitting and capital investment required. It would cost billions of dollars to add super cold freezers to every cold storage facility, seafood distributor facility, restaurant, sushi bar, and supermarket across the U.S. Because of this high cost relative to the size of the U.S. market, super freezers are not a practical solution.

Therefore, there is a need for new technologies to preserve the vitality of seafood, particularly the color characteristic of sashimi tuna meat after being frozen and thawed.

It is therefore an object of the present invention to provide a process of manufacturing tasteless super-purified smoke for the treatment of filleted tuna and other seafood species (and other meat, and meat products) to be frozen and thawed.

It is a further object of this invention to select a fuel, or fuels, and a combustion process that will generate an all natural, organic smoke that can be filtered.

It is a still further object of this invention to purify the smoke by filtering out a substantial amount of odor and taste imparting particulate matter and gaseous vapors, recovering super-purified smoke in a tasteless form.

It is a still further object of this invention to super purify the smoke to be completely non-toxic by separating out or absorbing out certain undesirable components that may be carcinogenic.

It is a still further object of this invention to store the tasteless super-purified smoke in either a temporary storage vessel or to pump it into canisters kept at ambient room temperature for future treatment of seafood (and other meat, and meat products).

It is a still further object of this invention to use the tasteless super-purified smoke to treat seafood, particularly filleted tuna, (and other meat, and meat products) without imparting a smoky taste to the food.

It is a still further object of this invention to use the tasteless super-purified smoke to make seafood (and other meat, and meat products) more organoleptically fresh and stable. organoleptic relates to the sensory organs' perception of freshness—smell, taste, tactile feel, and visual appearance.

It is a still further object of this invention to use the tasteless super-purified smoke to make the color of seafood (and other meat, and meat products) more stable.

It is a still further object of this invention to provide a process to efficiently treat with tasteless super-purified smoke, vacuum pack, freeze, and thaw tuna and other seafood species (and other meat, and meat products).

It is a still further object of this invention prior to treatment with tasteless super-purified smoke to dip tuna and other seafood sashimi slices in a solution to stabilize color, enhance flavor, and firm texture.

It is a still further object of this invention to use the tasteless super-purified smoke for treatment of seafood in a plastic bag, in other forms of treatment vessels, or by direct injection.

It is a still further object of this invention to expose seafood to the tasteless super-purified smoke for a duration suitable to cause the below effects but not so long as to be deleterious to the wholesomeness of the seafood:
1. To allow penetration of the smoke into the seafood, significantly delaying the development of aerobic bacteria during processing and storage.
2. To allow the smoke to be absorbed or retained into the flesh of the seafood extending the preservative effect after exposure.
3. To preserve the freshness, flavor, and shelf life of the seafood by inhibiting bacteria and decomposition after exposure.
4. To preserve the color by absorption of smoke into the seafood, minimizing oxidation.
5. To prolong the vitality of the seafood and achieve a similar look to fresh seafood after the seafood is frozen and thawed.

It is a still further object of this invention to vacuum pack the seafood, preferably in a semi-permeable vacuum pouch immediately after treatment exposure, to protect the seafood from contamination, and to seal in any smoke components absorbed or retained in the flesh of the seafood.

It is a still further object of this invention to provide an absorbent material inside the vacuum pouch to absorb excess moisture lost during thawing and to prevent the seafood from soaking in such liquid.

It is a still further object of this invention to initially freeze the seafood at a sufficiently low temperature, −76 degrees Fahrenheit (−60 degrees Centigrade) or less, to allow later storage at normal freezing temperatures of −4 degrees Fahrenheit (−20 degrees Centigrade) or less for up to one year without any degradation in its vitality.

It is a still further object of this invention to provide a slow thaw and quick thaw technique to thaw the seafood while maintaining vitality.

It is a still further object of this invention to allow a small amount of oxygen to penetrate through the semi-permeable vacuum bag after thawing to allow for normal decomposition of the seafood.

BACKGROUND ART

Various aspects of the individual steps of the multiple step process of this invention are known in the art, and various aspects appear to be new, useful, and not obvious. However, no reference could be located that describes the combination of process steps disclosed herein to super-purify smoke by removing the high quantity of particulate matter and taste imparting vapors necessary to produce a substantially tasteless smoke that will not impart a smoked taste to treated food.

Dating back thousands of years, before the invention of refrigeration, freezing and canning processes, various foods were cured by natural smoke. Natural smoke can preserve the nutritional components and wholesomeness of meats and seafood, while at the same time retarding spoilage. Smoked meats such as ham, bacon, beef jerky, sausage, poultry and smoked seafood are all examples of popular foods treated by smoke. The shelf life of meats can be extended to over one year (without refrigeration) by smoking. The taste of sausage and the color of ham are enhanced by smoking.

Following the invention of refrigeration, the vitality of whole or filleted seafood and other meats have been prolonged by maintaining the foods in cold storage of 28 to 40 degrees Fahrenheit (−2 to 5 degrees Centigrade). Seafood, in particular, in its raw state begins decomposition quickly at temperatures above 50 degrees Fahrenheit (10 degrees Centigrade). Seafood can be maintained fresh and unfrozen for up to two to three weeks at temperatures of 27 to 32 degrees Fahrenheit (−3 to 0 degrees Centigrade) due to the salt content in the meat. However, decomposition is inevitable and rapid after this time period and other methods of freezing, canning, and smoking have been necessary to extend the shelf life of the food.

Many types of smoking have been taught over the years to produce a variety of effects. Hot smoke will cook, dry, and dehydrate the flesh. Cold smoke will keep the meat moist and succulent. Components of the smoke emitted from various types of fuel will enhance the taste and preserve the color of the food. The combinations and variations in temperature from sub-freezing to over 200 degrees Fahrenheit (111 degrees Centigrade), fuel types, humidity, circulation and exposure times are great. In every case prior to this invention the result has been a smoke flavored food.

On Jun. 18, 1991, the Association of Food and Drug Officials, a national U.S. public sector organization, adopted a model code prepared by its Retail Food Subcommittee entitled "Good Manufacturing Practices for Cured, Salted, and Smoked Fish Establishments." Section 5.4 (a) (2) of this model code states that "The temperature in the smoking chamber does not exceed 50 degrees Fahrenheit (10 degrees Centigrade) during a drying and smoking period that does not exceed 24 hours," . . .

The longer the smoking period in this model code, the lower the maximum smoking temperature. For smoking periods of 30 to 48 hours the maximum smoking temperature declines to as low as 32 degrees Fahrenheit (0 degrees Centigrade). Thus, it has been established since 1991 that maximum cold smoking temperatures for smoking periods of 24 to 48 hours can vary from 32 to 50 degrees Fahrenheit (0 to 10 degrees Centigrade) in order to keep the meat moist, succulent, and free from bacterial degeneration or contamination.

Cold smoking is an obvious choice for fresh seafood which normally requires constant cold storage to slow down decomposition and discoloration as evidenced by Section 4.1 (c) of this model code which states "Fresh fish, except those to be immediately processed, shall be iced or otherwise refrigerated to an internal temperature of 38 degrees Fahrenheit or below (3 degrees Centigrade or below) upon receipt and shall be maintained at that temperature until the fish are to be processed."

Section 4.2 states that "all operations involving the receiving, holding, processing and packaging of processed fish shall be conducted utilizing clean and sanitary methods and shall be conducted as rapidly as practical and at temperatures that will not cause any material increase in bacterial or other micro organic content or any degeneration or contamination of such processed fish." In addition, the 1994 U.S. Food and Drug Administration (F.D.A.) Fish and Fishery Products Hazards and controls Guide recommends a thorough organoleptic examination of seafood product that exceeds 40 degrees Fahrenheit (4.4 degrees Centigrade) at any time during processing.

In 1989 Alkar Inc. of Wisconsin designed and built a laboratory smokehouse for Iowa State University with specifications allowing for smoking at temperatures as low as 32 degrees Fahrenheit (0 degrees Centigrade). In this design Alkar utilized a refrigeration coil inside the smoking chamber to cool the smoke down and maintain it at these low temperatures. Subsequent commercial smokehouses throughout the industry have been outfitted with return air ducts with cooling coils to allow for cold smoking of fresh fish at temperatures specified in the model code above.

Furthermore, smokehouses have equipment for purifying the smoke during, and at the exhaust, of the smoking process. In 1995 Alkar presented a paper entitled "An Overview of Air Pollution Control Equipment for Smokehouses" and described all current types of exhaust control equipment divided into two major classes—particulate collection equipment, and gaseous control equipment. Particulate collection equipment includes electrostatic precipitators, venturi scrubbers, and ionizing wet scrubbers. Gaseous control equipment includes absorption systems such as packed columns and incinerators.

U.S. Pat. No. 5,484,619 to Yamaoka et al discloses a method and apparatus that use extra low temperature smoking of fish and meat to sterilize and prevent decomposition and discoloration while imparting an agreeable smoked taste and smell.

U.S. Pat. No. 889,828 to Trescott discloses a device for curing edible matter comprised of a curing apartment, a smoke supply source, and a combined smoke cooling, purifying, and drying chamber where a portion of moisture and carbon soot condenses on the walls of the chamber. Trescott's method and apparatus, as with Yamaoka's, utilizes partially purified smoke containing odor and taste imparting particulate matter and vapors flowing freely in contact with the edible matter, imparting a smoke flavored taste.

U.S. Pat. No. 4,522,835 to Woodruff et al teaches a method of maintaining redness in fish and red meat by first subjecting such fish or meat to an oxygen deprived atmosphere and then exposing the fish or meat to a modified atmosphere containing a small amount of carbon monoxide. Industrially manufactured carbon monoxide gas is produced using caustic chemicals and can contain toxic impurities. Treatment of seafood or meats with carbon monoxide gas is therefore prohibited by the U.S. F.D.A. and the Japan Ministry of Public Health.

U.S. Pat. No. 3,122,748 to Beebe relates to a method of treating red meat with carbon monoxide to achieve the appearance of meat that has been freshly cut. As with Woodruff, Beebe's method utilizes a gas that is prohibited for such use in the U.S. and Japan. Conversely, treatment of seafood, poultry, or meat with a natural smoking process is generally recognized as safe (GRAS) by the U.S. F.D.A. and the Japan Ministry of Public Health.

Soviet Patent SU 847973 to Kichkar, Nasibov, and Bunin discloses a method for the cold curing of fish products by stabilizing the temperature and velocity of the smoke in a smoking chamber kept in a range of approximately 32 to 36 degrees Fahrenheit (0 to 2 degrees Centigrade). Kichkar et al's cold smoking process results in phenol levels rising in the body of salmon more quickly than earlier methods reducing processing time and producing quality smoked taste, color, and preservative characteristics.

German Patent DE 3826211 to Schich teaches a smoking process using a condenser cooled filtered smoke. Smoke from a smoke generator is passed through a cooling condenser maintained at 5 to 14 degrees Fahrenheit (−10 to −15 degrees Centigrade) to form a condensate of carbon, other suspended materials, tar and gum which is discharged. Schich's method removes substantially all tar, pollutants and carcinogens and does not impact the taste and aroma imparting ingredients in the smoke.

The burning of wood sawdust, in an oxygen restricted retort has been empirically discovered to be the most efficient way to produce high quality smoke from an organic material. However, other organic materials such as leaves, bagasse from sugar cane, pineapple husks, and rice hulls can all be used successfully to produce a volume of smoke in any substantially oxygen free chamber at a lesser amount than the volume achieved from burning wood sawdust in a retort.

The smoke produced from burning wood and other organic material fuels is a function of combustion temperature and amount of air intake. FIG. 1 shows the composition of wood smoke emissions at varying combustion temperatures. The formation of deleterious polycyclic aromatic hydrocarbons (PAHS), and oxidation of organic vapors, including both condensable organic compounds as well as volatile organic compounds (VOCs) can be prevented by combusting below 850 degrees Fahrenheit (454 degrees Centigrade). If wood is combusted above this temperature level and these compounds are formed, they can be successfully filtered later in the process.

To minimize formation of these compounds and to conform to empirical data from our laboratory tests, an operable combustion temperature range of 400 to 950 degrees Fahrenheit (204 to 510 degrees Centigrade), a preferred range of 500 to 800 degrees Fahrenheit (260 to 571 degrees Centigrade), and an optimal range of 650 to 750 degrees Fahrenheit (343 to 399 degrees Centigrade) are established for the process described herein.

Typical wood fuels for smoking contain primarily a hydrocarbon composition of hydrogen and carbon along with other elements of sulfur, nitrogen, oxygen, and ash compounds of silicon dioxide, ferrous trioxide, titanium dioxide, aluminum trioxide, manganese tetrioxide, calcium oxide, magnesium oxide, sodium oxide, potassium oxide, sulfur dioxide, and chloride as shown in Table is

TABLE 1

TYPICAL WOOD FUEL CHEMICAL ANALYSIS

|  | Oak Chips | Spruce Chips |
| --- | --- | --- |
| Analysis (dry basis), % by weight Proximate |  |  |
| Volatile matter | 76.0 | 69.5 |
| Fixed carbon | 18.7 | 26.6 |
| Ash | 5.3 | 3.8 |
| Ultimate |  |  |
| Hydrogen | 5.4 | 5.7 |
| Carbon | 49.7 | 51.8 |
| Sulfur | 0.1 | 0.1 |
| Nitrogen | 0.2 | 0.2 |
| Oxygen | 39.3 | 38.4 |
| Ash | 5.3 | 3.8 |
| Heating value, Btu/lb | 8,370 | 8,740 |
| Ash Analysis % by wt |  |  |
| $SiO_2$ | 11.1 | 32.0 |
| $Fe_2O_3$ | 3.3 | 6.4 |
| $TiO_2$ | 0.1 | 0.6 |
| $Al_2O_3$ | 0.1 | 11.0 |
| $Mn_3O_4$ | Trace | 1.5 |
| CaO | 64.5 | 25.3 |
| MgO | 1.2 | 4.1 |
| $Na_2O$ | 8.0 | 8.0 |
| $K_2O$ | 0.2 | 2.4 |
| $SO_3$ | 2.0 | 2.1 |
| Cl | Trace | Trace |

Source: "Wood residue—fired steam generator particulate matter control technology assessment, U.S. E.P.A., 1978.

The smoke produced from burning wood and other organic material fuels contains water vapor, $CO_2$, CO, $CH_4$ (methane); tiny particulates of creosote, tar, soot, and trace elements; and over 390 microscopic compounds occurring in either, or both, particulate and gaseous (vapor) phases. Larson and Koenig compiled "A Summary of the Emissions Characterization and Noncancer Respiratory Effects of Wood Smoke" in 1993. Table 2 from this report summarizes all the reported constituents in wood smoke and the ranges of their emission rates.

$CO_2$, CO, $NO_2$, NO, and monoaromatic phenols constituents in wood smoke all have preservative effects on treated seafood and meat. $CO_2$ is the preservative of choice in modified atmosphere packaging of fresh seafood as it is easily absorbed into the meat displacing oxygen and inhibiting bacterial growth. Phenols, which are present in much smaller amounts than $CO_2$, operate similarly as bacteria inhibitors. CO, $NO_2$, and NO undergo chemical reactions with myoglobin to retard decomposition.

The invention described herein is primarily concerned with super-purifying smoke to eliminate the flavor and aroma components of both the smoke and the seafood or meat subsequently treated. Maga compiled a comprehensive review of the literature in 1988 in "Smoke in Food Processing." In this review, he cites thirteen researchers who conclude that the most important flavor components of smoke are monoaromatic phenols occurring in both the particulate and gaseous vapor phases.

The phenolic particulate phase has lower odor and taste recognition thresholds than the gaseous vapor phase indicating that a smaller quantity of particulate is required to produce the same level of smoke odor and taste as the gaseous vapor phase. The particulate phase also contains high levels of undesirable pollutants including tar, soot, ash, and char which are desirably filtered.

Therefore, it is typical in smoking of foods to filter pollutants from the phenolic particulate phase while retaining the gaseous vapor phase for characteristic smoke flavoring. The amounts of tar, soot, ash, char and other microscopic particulates have been filtered and minimized by many methods in current practice including tar settling systems, baffling systems, and washing systems in the line from the smoke generator to the smoking chamber. In addition, cooling and storage reduces the concentrations of phenolic particulate through settling. Some of these filtering methods remove substantially all the tar and particulate from wood smoke leaving only the gaseous vapor phase which produces the characteristic smoke flavor.

Daun isolated the phenolic fraction from both the vapor and particulate phases of wood smoke and through dilution determined, with the aid of a sensory panel, their recognition threshold and most desirable concentration for both odor and taste sensations. These data are summarized in Table 3.

Yamaoka et al claim a smoking method comprising a step "passing the produced smoke through a filter to remove mainly tar." Such tar filters are standard elements in smoke generating systems sold today. However, since the flavor producing, monaromatic phenols in the gaseous vapor phase remain, Yamaoka's method imparts an "agreeable taste and smell" and does not produce tasteless smoke or tasteless food as does the process described herein.

Kichkar et al achieve up to 304 milligrams of phenols combined from both the particulate and gaseous vapor phases of wood smoke absorbed into the body of a salmon of approximately five kilograms, or 60.8 parts per million (ppm). This is the desirable concentration for quality smoked taste. Since the invention described herein is concerned with eliminating any flavor or aroma imparted to the treated seafood or meat, we have determined empirically that the recognition threshold for phenols in seafood or meat is approximately 9.4 ppm. However, even if the phenols in the seafood or meat are below this recognition threshold, they still exert positive preservative effects as bacteria inhibitors.

TABLE 2

CHEMICAL COMPOSITION OF WOOD SMOKE

| Species 1 | g/kg wood 2 | Physical State 3 | Reference |
| --- | --- | --- | --- |
| Water Vapor | 35–105 | v | 2 |
| Carbon Dioxide | 70–200 | v | 2 |
| Carbon Monoxide | 80–370 | v | 4,5 |
| Methane | 14–25 | v | 5 |
| VOCs (C2–C&) | 7–27 | v | 5 |
| Aldehydes | 0.6–5.4 | v | 4,6 |
| Formaldehyde | 0.1–0.7 | v | 4,6 |
| Acrolein | 0.02–01 | v | 6 |

TABLE 2-continued

CHEMICAL COMPOSITION OF WOOD SMOKE

| Species 1 | g/kg wood 2 | Physical State 3 | Reference |
|---|---|---|---|
| Propionaldehyde | 0.1–0.3 | v | 4,6 |
| Butryaldehyde | 0.01–1.7 | v | 4,6 |
| Acetaldehyde | 0.03–0.6 | v | 4,6 |
| Furfural | 0.2–1.6 | v | 7,8 |
| Substituted Furans | 0.15–1.7 | v | 5 |
| Benzene | 0.6–4.0 | v | 9 |
| Alkyl Benzenes | 1–6 | v | 9 |
| Toluene | 0.15–1.0 | v | 7 |
| Acetic Acid | 1.8–2.4 | v | 7 |
| Formic Acid | 0.06–0.08 | v | 4,5 |
| Nitrogen Oxides (NO, NO2) | 0.2–0.9 | v | 4 |
| Sulfur Dioxide | 0.16–0.24 | v | 10 |
| Methyl chloride | 0.0–0.04 | v | 9 |
| Napthalene | 0.24–1.6 | v | 9 |
| Substituted Napthalenes | 0.3–2.1 | v/P | 9 |
| Oygenated Monoaromatics | 1–7 | v/P | 11 |
| Guaiacols | 0.4–1.6 | v/P | 11 |
| Phenols | 0.2–0.8 | v/P | 11 |
| Syringols | 0.7–2.7 | v/P | 11 |
| Catechols | 0.2–0.8 | v/P | 5 |
| Total Particulate Mass | 7–30 | P | 12 |
| Oxygenated PAHs | 0.15–1.0 | v/P | 13 |
| PAHS | | | |
| Fluorene | 0.00004–0.017 | v/P | 13 |
| Phenanthrene | 0.00002–0.034 | v/P | 13 |
| Anthracene | 0.00005–0.021 | v/P | 13 |
| Methylanthracenes | 0.00007–0.008 | v/P | 13 |
| Fluoranthene | 0.0007–0.042 | v/P | 13 |
| Pyrene | 0.0008–0.031 | v/P | 13 |
| Benzo(a)anthracene | 0.0004–0.002 | v/P | 13 |
| Chrysene | 0.0005–0.01 | v/P | 13 |
| Benzofluranthenes | 0.0006–0.005 | v/P | 13 |
| Benzo(e)pyrene | 0.0002–0.004 | v/P | 13 |
| Benzo(a)pyrene | 0.0003–0.005 | v/P | 13 |
| Perylene | 0.00005–0.003 | v/P | 13 |
| Ideno(1,2,3-cd)pyrene | 0.0002–0.013 | v/P | 13 |
| Benz(ghi)perylene | 0.00005–0.011 | v/P | 13 |
| Coronene | 0.0008–0.003 | v/P | 13 |
| Dibenzo(a,h)pyrene | 0.0003–0.001 | v/P | 13 |
| Retene | 0.007–10.03 | v/P | 14 |
| Dibenz (a,h)anthracene | 0.00002–0.002 | v/P | 13 |
| Trace Elements | | | |
| Na | 0.003–0.018 | P | 15 |
| Mg | 0.0002–0.003 | P | 15 |
| Al | 0.0001–0.024 | P | 15 |
| Si | 0.0003–0.031 | P | 15 |
| S | 0.001–0.029 | P | 15 |
| Cl | 0.0007–0.21 | P | 15 |
| K | 0.003–0.086 | P | 15 |
| Ca | 0.0009–0.018 | P | 15 |
| Ti | 0.00004–0.003 | P | 15 |
| V | 0.00002–0.004 | P | 15 |
| Cr | 0.00002–0.003 | P | 15 |
| Mn | 0.00007–0.004 | P | 15 |
| Fe | 0.0003–0.005 | P | 15 |
| Ni | 0.000001–0.001 | P | 15 |
| Cu | 0.0002–0.0009 | P | 15 |
| Zn | 0.00007–0.004 | P | 15 |
| Br | 0.00007–0.0009 | P | 15 |
| Pb | 0.0001–0.003 | P | 15 |
| Particulate Elemental Carbon | 0.3–5 | P | 16 |
| Normal Alkanes | 0.001–0.006 | P | 17 |
| (C24-C30) | | | |
| Cyclic di- and triterpenoids | | | |
| Dehydroabietic acid | 0.001–0.006 | P | 18 |
| Isopimaric acid | 0.02–0.10 | P | 18 |
| Lupenone | 0.002–0.008 | P | 18 |
| Friedelin | 0.000004–0.00002 | P | 18 |
| Chlorinated dioxins | 0.00001–0.00004 | P | 19 |
| Particulate Acidity | 0.007–0.07 | P | 20 |

1. Some species are grouped into general classes as indicated by italics.
2. To estimate the weight percentage in the exhaust, divide the g/kg value by 80. This assumes that there are 7.3 kg combustion air per kg of wood. Carbon dioxide and water vapor average 12 and 7 weight percent respectively.
3. At ambient conditions: V=vapor, P=particulate, and V/P= vapor and/or particulate (i.e., semi-volatile).
4. DeAngelis (1980)
5. OMNI (1988)
6. Lipari (1984), values for fireplaces
7. Edye et al (1991), smoldering conditions; other substituted furans include 2-furanmenthanol, 2 acetylfuran, 5-methyl-2furaldehyde, and benzofuran.
8. value estimated for pine from Edye et al (1991) from reported yield relative to guaiacol, from guaiacol values of Hawthorne (1989) and assuming particulate organic carbon is 50% of total particle mass.
9. Steiber et al (1992), values computed assuming a range of 3–20 g of total extractable, speciated mass per kg wood.
10. Khalil (1983)
11. Hawthorne (1989), values for syringol or hardwood fuel; see also Hawthorne (1988)
12. Core (1989), DeAngelis (1980), Kalman and Larson (1987)
13. From one or more of the following studies: Cooke (1981), Truesdale (1984), Alfheim et al (1984), Zeedijk (1986), Core (1989), Kalman and Larson (1987); assuming a range of 7 to 30 grams particulate mass per kg wood when values were reported in grams per gram of particulate mass. Similar assumptions apply to references 14, 15, and references 17–19.
14. Core (1989), Kalman and Larson (1987)
15. Watson (1979), Core (1989, Kalman and Larson (1987)
16. Rau (1989), Core (1989)
17. Core (1989)
18. Standley and Simoneit (1990); Dehydroabietic acid values for pine smoke, lupenone and isopimaric acid values for alder smoke, and friedelin values for oak soot.
19. Nestrick and Lamparski (1982), from particulate condensed on flue pipes; includes TCDDS, HCDDS, H7CDDs and OCDDs.
20. Burnet et al (1986); one gram of acid = one equivalent of acid needed to reach a pH of 5.6 in extract solution.

TABLE 3

ODOR AND TASTE RECOGNITION THRESHOLDS (ppm)
AND MOST DESIRABLE CONCENTRATIONS (ppm) OF
THE PHENOLIC FRACTION ISOLATED
FROM THE VAPOR AND
PARTICULATE PHASES OF WOOD SMOKE

| Recognition threshold | | Most desirable concentration | |
|---|---|---|---|
| Odor | | | |
| Vapor | Particulate | Vapor | Particulate |
| 10.4 | 7.8 | 20.8 | 16.7 |
| Taste | | | |
| Vapor | Particulate | Vapor | Particulate |
| 2.3 | 1.4 | 15.6 | 8.3 |

Adapted from Daun, H., Lebensm. Wiss. Technol., 5, 102, 1972

The seafood or meat treated with wood smoke has myoglobin molecules with open receptors that can undergo a chemical reaction with a variety of compounds present in the smoke—$O_2$, CO, NO, $NO_2$ and $H_2O$. It is important in cold smoking to keep the meat raw and uncooked to maximize the amount of vital cells available for this reaction. The myoglobin in its natural state is purple. When the myoglobin binds with $O_2$ it produces oxymyoglobin which is bright red; with CO it produces carboxymyoglobin which is red; with NO and $NO_2$ it produces nitric oxide myoglobin and nitrogen dioxide myoglobin which are also red; and with $H_2O$ it produces metmyoglobin which is brown.

Carboxymyoglobin is preferred because of its stable organoleptic freshness characteristics as well as its stable red color. The organoleptic "sniff test" shows significant retardation of decomposition of cold smoked product high in carboxymyoglobin. For example, cold smoked and vacuum packed salmon can be refrigerated for several months without any decomposition.

SUMMARY OF THE INVENTION

The above and other objects are achieved by a process comprising the manufacturing of tasteless super-purified smoke, utilizing such manufactured smoke to treat seafood, and freezing and thawing of the treated seafood.

The manufacturing process begins with the smoke generating part of the apparatus using a natural gas or electric burner to combust wood sawdust packed into a multiple cylinder retort at temperatures in an operable range of 400 to 950 degrees Fahrenheit (204 to 510 degrees Centigrade), a preferred range of 500 to 800 degrees Fahrenheit (260 to 571 degrees Centigrade), and an optimal range of 650 to 750 degrees Fahrenheit (343 to 399 degrees Centigrade) in an oxygen deprived environment.

The apparatus can be adjusted to utilize wood sawdust or other organic burning materials producing less dense smoke by varying the number of cylinders in the retort from as little as one to as many as necessary to produce the volume of smoke desired. In addition, any substantially oxygen free chamber besides a retort can be used. Combusting a five cylinder retort packed with wood sawdust is the preferred embodiment described herein.

The pyrolysis of the wood sawdust into smoke creates byproducts of tar, moisture, and particulate residue at the outlet of the smoke generating subsystem. These byproducts are collected in liquid form in a tar/moisture/residue condensation chamber and drained out a purge valve near the end of the process. This valve also serves the dual purpose of being a flush valve to allow air into the airtight system after the liquid residue is drained.

The smoke is next super-purified such that the phenols in both particulate and gaseous vapor phases are reduced to concentrations below recognition thresholds for odor and taste that impart a smoked flavor to the treated food. Commercial air pollution control equipment such as electrostatic precipitators, venturi scrubbers, ionizing wet scrubbers, and packed columns, normally used to clean smokehouse exhaust, can be used after smoke generation and before treatment of the product to remove a portion of these flavor imparting phenols from the smoke.

Complete super purification of smoke can be accomplished using one method, or a combination of methods, in current practice, including filtering, separating, distilling, scrubbing, cooling, freezing, inertial impact, centrifugal force, or settling. Filtering techniques of adsorption or molecular sieve absorption can be used effectively. For example, a very large activated carbon filter alone can substantially super-purify smoke, yet this method is expensive and requires extensive maintenance. Successful combinations include bubbling the smoke through a water filter and then a smaller activated carbon filter; using a water vapor wash and an activated carbon filter; and using the above combinations with cloth filters. Smoke can be super-purified by any method, or combination of methods, that reduce both the flavor imparting particulate and gaseous vapor phase phenols below their odor and taste recognition thresholds, or by using the preferred embodiment described as follows:

The smoke is most efficiently super-purified by flowing through a precipitation tower which washes and filters the smoke through ice and a combination of adsorbent and molecular sieve filters of cloth and activated carbon. Adsorption is the accumulation of gases, liquids, or solutes on the surface of a solid or liquid and occurs when the smoke flows through the activated carbon. The activated carbon filter in our invention effectively adsorbs phenols in the gaseous vapor phase to concentrations below their odor and taste recognition thresholds. The molecular sieve cloth filters absorb gaseous vapor and particulate matter.

The precipitation tower is preferably longer than it is wide and is positioned on a vertical axis. The tower has an ice chamber with a square cross section smaller at the bottom entry of the perforated smoke intake pipe and larger at the top entry to the activated carbon and cloth filters to ensure that the smoke flows evenly throughout the ice. Alternatively, a precipitation tower with an ice chamber that is wider than it is long, or positioned on a horizontal axis, can work successfully by using a series of horizontally spaced vertical intake pipes, using a horizontal intake pipe with spaced perforated dispensing holes, or by replacing the ice with another filtering material. In addition, an agitator can be installed to prevent clustering and clumping of filtering materials.

To maximize the yield of tasteless super-purified smoke, the ice, carbon, or any other filtering medium utilized should displace as much air space as possible inside the precipitation tower to minimize places where smoke can be trapped in the system. The filtering materials in the precipitation tower displace an operable range of more than 50%, a preferred range of more than 75%, and an optimal range of more than 90% of the tower's inner volume.

The precipitation tower operates as a miniature controlled earth atmosphere where ice is violently vaporized by hot smoke into steam. A portion of this "steamified" smoke condenses as it cools and washes a large amount of particulate matter from the smoke by raining down through the system.

The sudden vaporization of the ice by the hot smoke results in high humidity in the precipitation tower. This increases the average size, weight, and adhesiveness of the particulate matter in the smoke making it easier to filter. Some oxidation occurs increasing the amount of $CO_2$ while decreasing the amount of CO. This washed smoke next passes through activated carbon and cloth filters to adsorb and absorb odor and taste imparting phenols and other carcinogenic particulates and gases.

At this point, substantially tasteless super-purified smoke can be used to directly flood a smoking treatment chamber filled with seafood or other meats to produce an acceptable result. There is no limit on the volume, or continuous flow of smoke that can be used as long as the phenol concentrations remain below the odor and taste recognition thresholds in both the smoke and the treated product. By minimizing the amount of smoke to produce the desired result, the amount of remaining phenols can also be minimized and kept below these recognition threshold levels. Such an abbreviated process is possibly better suited for high production volume situations.

Alternatively, the smoke can be pumped into an expandable, or fixed, storage chamber for short term storage, or into a canister for long term storage. An analysis of capital equipment costs, labor costs, and production volume requirements will determine the treatment method to be used with the tasteless super-purified smoke. In most cases, the preferred embodiment is to further purify the smoke in a settling pot and to allow for more versatility, convenience and economy by either using the smoke to treat seafood in plastic bags or by transferring the smoke to canisters for storage and future use.

In a preferred embodiment, a temporary pressure pot with an inner collapsible accordion bladder is evacuated by a two way vacuum pump to collapse the bladder up to the top of the pot. This pot is equal in size to the volume of smoke produced by the pyrolysis of the wood sawdust in the five cylinder retort. The pressure pot with collapsed bladder remains evacuated until the smoke reaches a certain concentration and flow as indicated by a smoke sensor and a flow meter in the line.

The smoke is pumped out an exhaust pipe until it reaches the desired concentration and flow. At this time the exhaust valve closes and three valves in the line to the pressure pot open. The smoke flows naturally to this evacuated temporary storage chamber filling the inner bladder as long as the concentration and flow levels exceed the prescribed levels. The natural expansion of the combustion into smoke from pre-combustible wood sawdust creates a natural pressure in the system. Therefore, tasteless super-purified smoke pressure builds in the temporary pressure pot in the preferred embodiment, or in alternative expandable or fixed temporary storage chambers.

When the smoke concentration and flow fall below the prescribed levels, the purge valve opens to allow the liquid residue to drain and flush air to enter the system. At the same time the two way pump in the line pumps the remaining smoke in the system into the pressure pot. This pump turns off when the smoke sensor indicates the system has been flushed and the last valve to the pressure pot closes containing the tasteless super-purified smoke in the temporary storage chamber.

At this point the tasteless super-purified smoke has been purified to below the odor and taste recognition threshold levels by the precipitation tower. However, several backup steps occur during storage until the treatment of the seafood or meat to ensure that the flavor imparting phenol levels are reduced even further below the recognition threshold levels.

The inner accordion bladder of the pressure pot is lined with absorbent material to absorb remaining flavor imparting gaseous vapor or particulate phase phenols in the smoke in the temporary storage chamber. The flavor imparting character of the smoke declines in three ways. Flavor imparting gaseous phase phenols are absorbed through contact with the absorbent material on all surfaces of the bladder's lining; particulate phase phenols settle by gravity over time and are also absorbed by the absorbent material primarily at the bottom of the bladder's lining; and, both gaseous vapor and particulate phase phenols naturally lose flavor-imparting potency over time. This weakening potency is due to the unstable characteristic of phenols which chemically react with other compounds and structurally decompose over time.

Therefore, allowing the phenols, and any other remaining carcinogens, in the smoke to settle, or "age", in the inner accordion bladder or in storage canisters for future use, is the final backup filtering step in the process. It is analogous to sediment settling in wine making.

If immediate treatment of seafood by the super-purified smoke is desired directly from the inner accordion bladder, the aging time is in an operable range of one hour to 72 hours, a preferable range of 12 hours to 60 hours, and an optimal range of 24 hours to 48 hours. If treatment at another time or place from storage canisters is desired, the aging time is in an operable range of greater than one hour, a preferable range of one week to one year, and an optimal range of two weeks to six months.

Practical process considerations have empirically determined that the shorter aging times are best when treatment is done directly from the inner accordion bladder. Since aging is a backup process as long as the flavor imparting phenols are below the odor and taste recognition thresholds, successful treatment can occur shortly after the tasteless super-purified smoke is stored in the temporary storage chamber, optimally in one to two days.

If treatment at another time or place is desired the aging continues in storage canisters and the flavor imparting phenol levels decline even further through decomposition. However, these canisters can not be kept indefinitely, since phenols that have a beneficial preservative effect will begin to degrade as well. Treatment from canisters may be done after one hour of aging and preferably within one year of aging. Therefore, the use of tasteless super-purified smoke does not have to correspond to the operation of the smoke manufacturing part of the process allowing for much flexibility and versatility industry wide.

If immediate treatment is desired, each whole tuna or other seafood species is taken from cold storage, filleted into loins, and then filleted into sashimi slices and steaks (smaller fish can be treated whole). sashimi slices are placed in a dipping solution to stabilize color, enhance flavor and firm the texture of the fish. Steaks, which are ultimately cooked and not consumed raw, do not require this step.

The filleted seafood is then placed in plastic bags. The air in each bag is substantially removed, a hose and dispensing nozzle from the pressure pot are inserted, and the valve is opened to flush the seafood with an operable rage of 0.05:1 or greater, a preferred range of 1:1 to 100:1, and an optimal range of 1.5:1 to 20:1 ratios of volume of tasteless, super-purified smoke to volume of seafood. The bag is then sealed.

The super-purified smoke treatment occurs until the desired penetration of tasteless super-purified smoke into the fish is complete. This desired penetration is complete after approximately twelve to forty-eight hours.

The minimum temperature during treatment varies with the type of seafood being treated and is approximately 0.2 degrees Fahrenheit (0.1 degree centigrade) above its variable freezing point. The treatment temperature is an operable range from above the variable seafood freezing point to 46 degrees Fahrenheit (7.8 degrees centigrade), a preferred range from above the variable seafood freezing point to 38 degrees Fahrenheit (3.4 degrees centigrade), and an optimal range from above the variable seafood freezing point to 35 degrees Fahrenheit (1.7 degrees centigrade).

If treatment at another time and/or place is desired, a compressor can be attached to the outlet hose from the pressure pot or, in an abbreviated process, to the carbon and cloth filter outlet of the precipitation tower. The compressor compresses the tasteless super-purified smoke into canisters at a desired pressure level. Utilizing these canisters, the following treatment procedure requires a delivery system consisting of a regulator, hose with injection nozzle, plastic bags, and a heat sealer.

As an alternative to the preferred treatment in plastic bags, the tasteless super-purified smoke can go from the storage canisters into any type of sealed treatment chamber containing the seafood. As a still further alternative to a smoke flushing treatment in plastic bags or other chambers, the tasteless super-purified smoke can be administered successfully by injection needles directly into the seafood. This alternative is preferable for thicker loin fillets where multiple injections of tasteless super-purified smoke treat the meat completely with overlapping conical areas.

After treatment is complete in the preferred embodiment, each plastic bag is emptied and the fish is repacked, preferably with an absorbent material in a semi-permeable vacuum pouch.

These vacuum packed pouches are next ideally frozen cryogenically at −76 degrees Fahrenheit (−60 degrees centigrade) or less and stored at −4 degrees Fahrenheit (−20 degrees centigrade) or less for up to one year without losing their vitality characteristics of freshness, flavor, color, and moisture retention after thawing.

Preferably, five pouches of steaks of 5.0 pounds (2.27 kilograms) each or 10 pouches of sashimi of 2.2 pounds (1.0 kilogram) each are packed in each master carton with optional instructions for either quick or slow thawing printed on the vacuum packs or included with the product.

The seafood product retailer, restaurant, or sushi bar either quick thaws only the number of pouches needed in cold water, preferably with a salt solution for approximately twenty to forty minutes or until the product is partially thawed; or slow thaws in a refrigerator, generally overnight for twelve to twenty-four hours. Each pouch is dried, cut open, and the sashimi slices or steaks are displayed for sale in a store or served in a restaurant. The product can also be retailed in frozen packages.

The carboxymyoglobin, nitric oxide myoglobin, and nitrogen dioxide myoglobin present in the treated product, as well as absorbed $CO_2$ and phenols from the super-purified smoke, result in both stable organoleptic freshness characteristics and stable red color after freezing and thawing. Such product will organoleptically stay fresh longer than untreated product before decomposition begins. However, this characteristic of enhanced freshness longevity does not often come into play since the product is thawed in small quantities only as needed and does not require extended shelf life in its thawed state.

BRIEF DESCRIPTION OF THE DRAWINGS AND CHARTS

FIG. 2 (*b*) shows the flush treatment plastic barrier bag subsystem.

FIG. 2 (*c*) shows the compressor and storage canister subsystem.

FIG. 3 (*b*) shows a top view of the retort subsystem.

FIG. 3 (*c*) shows a side view of the retort subsystem.

BEST MODE FOR CARRYING OUT INVENTION

Figure 1:
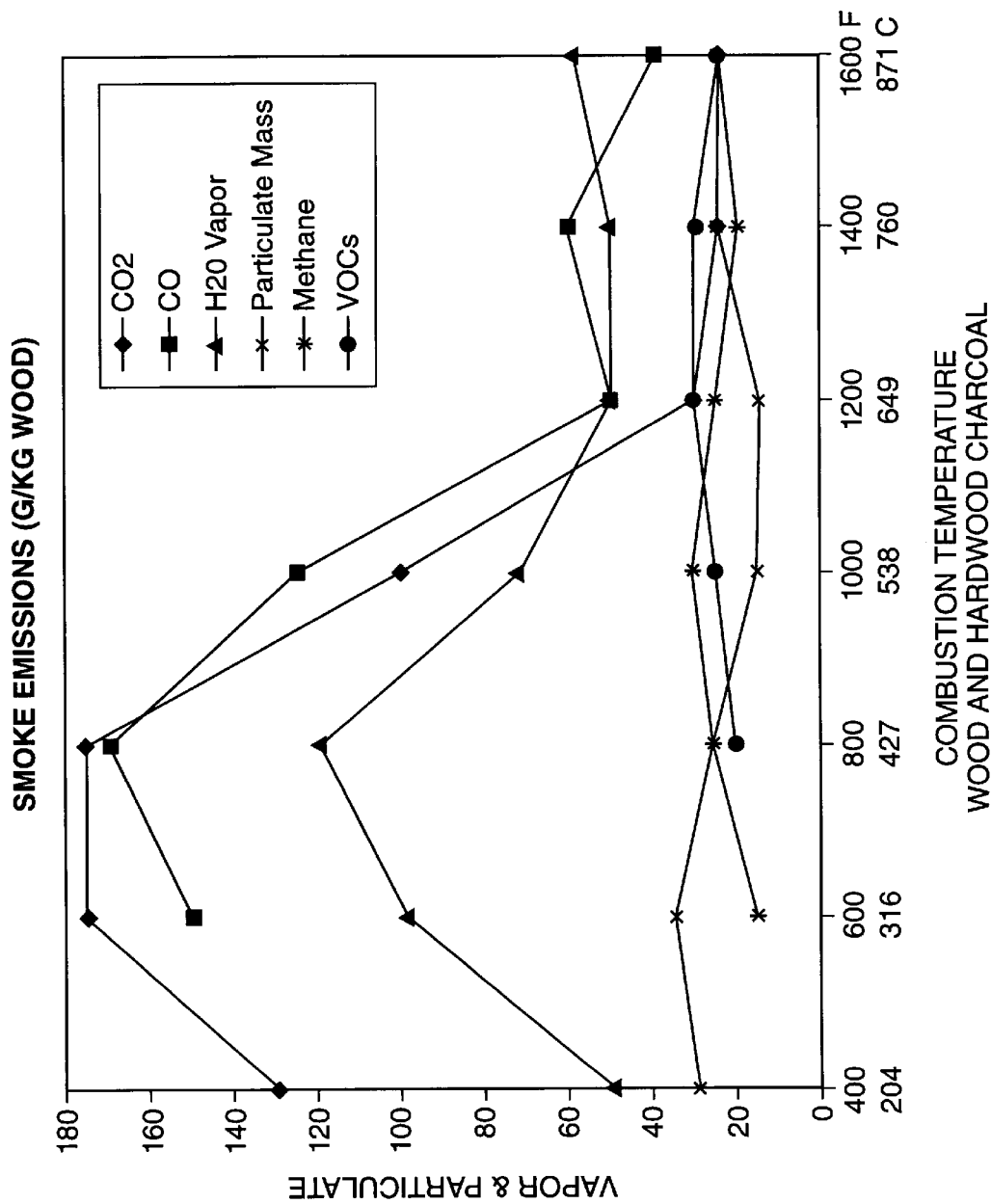
FIG. 1 is a graph showing the composition of wood and hardwood charcoal smoke emissions at varying temperatures..
Figure 2A:
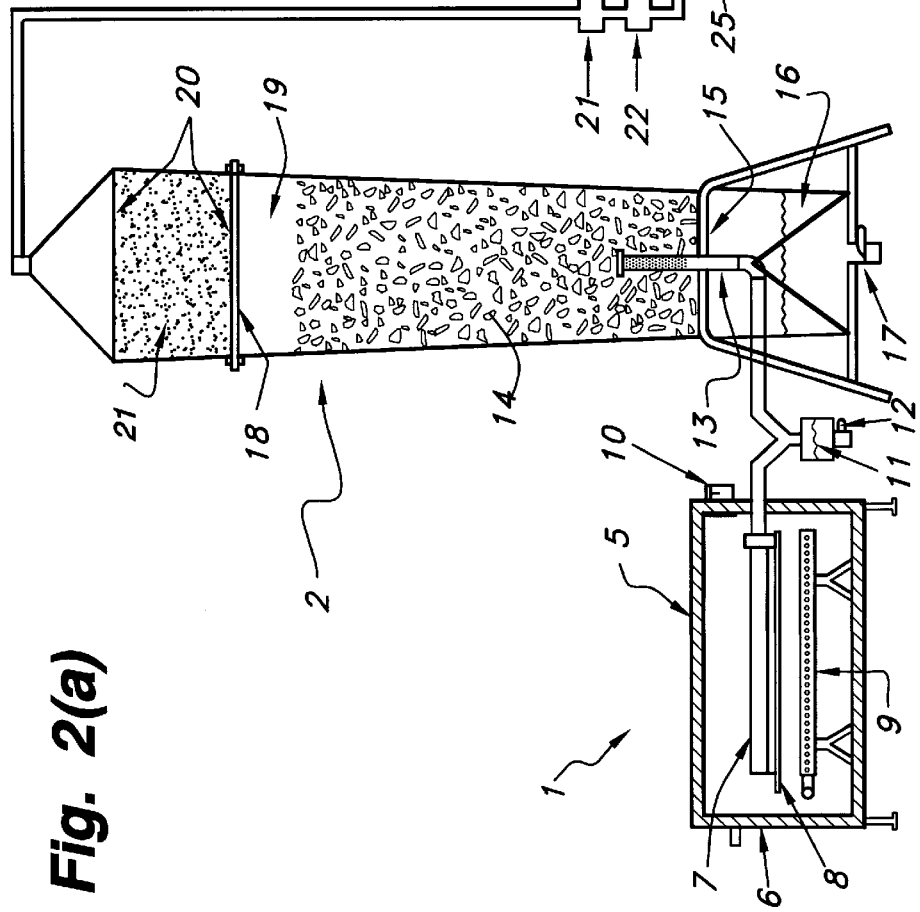
FIG. 2 (*a*) shows a presently preferred embodiment of a tasteless super-purified smoke manufacturing apparatus used in the practiced process.
Figure 2B:
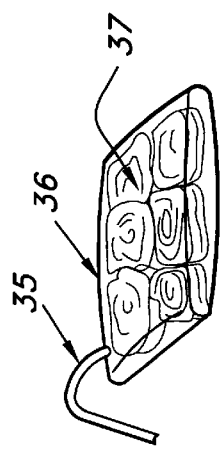
Figure 2C:
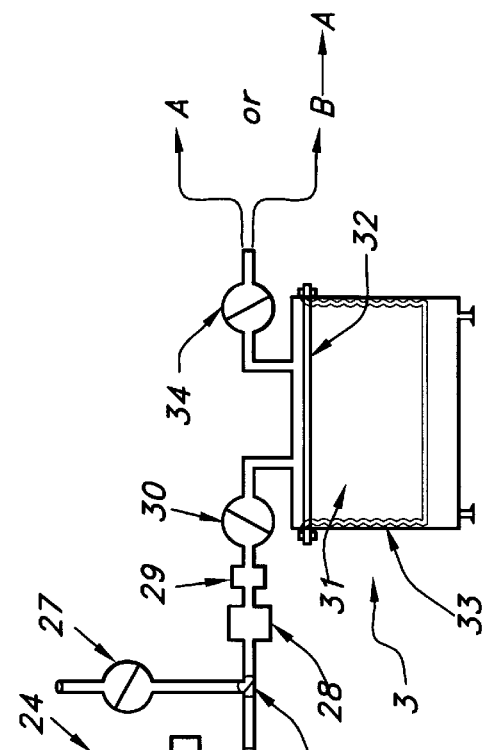

The presently preferred embodiment of the tasteless super-purified smoke manufacturing apparatus used in the practiced process shown in FIG. 2 (*a*) is comprised of a smoke generator 1, a precipitation filtering tower 2, and a temporary pressure pot storage chamber 3. FIG. 2 (*b*) shows a flush treatment plastic bag subsystem and FIG. 2 (*c*) shows an alternative intermediate step of a compressor and storage canister subsystem.

Figure 3B:
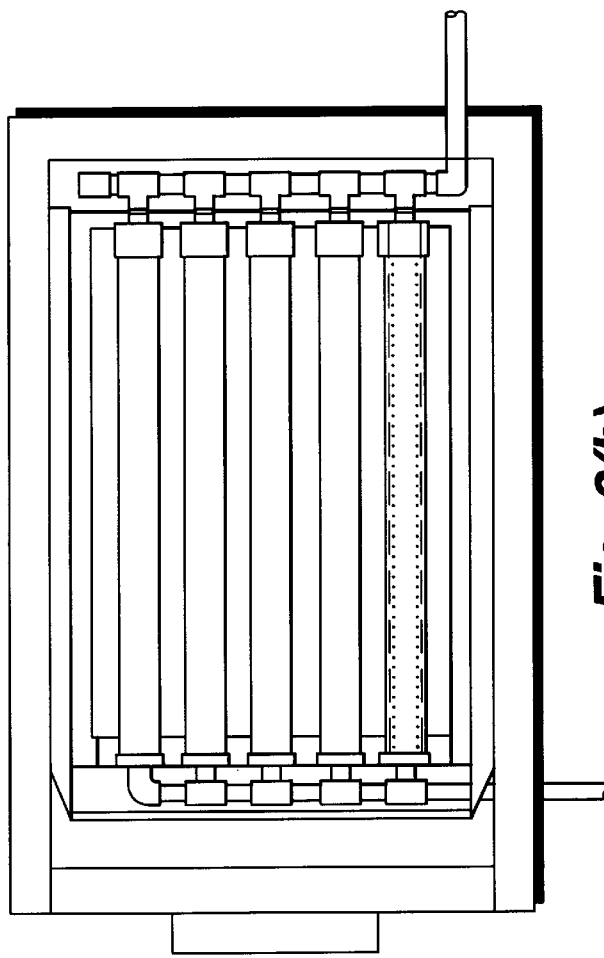
FIG. 3 (*a*) shows a front view of the retort subsystem of the super-purified smoke manufacturing process.
Figure 3C:
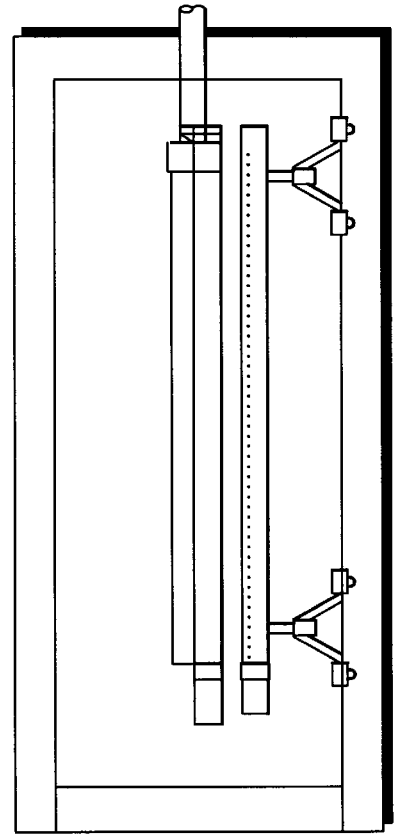
Figure 3A:
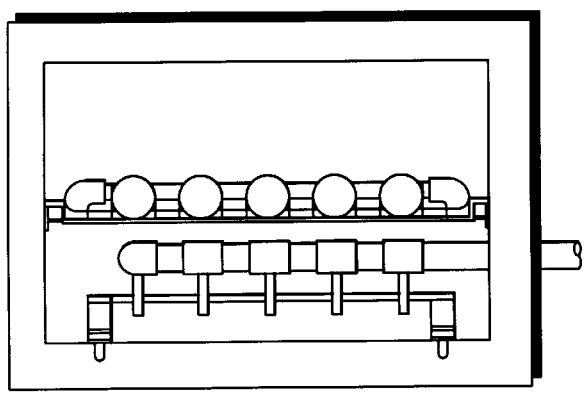

The smoke generator 1 is comprised of a 10" high by 15" wide by 24" (15.4 cm×38.1 cm×61.0 cm) deep shell lined with refractory insulation 5, a refractory insulated door 6 with air vents, a retort subsystem 7 (shown in detail in FIGS. 3 (*a*–*c*)), a shelf 8, a natural gas burner 9, and thermostat 10.

In the preferred embodiment the retort subsystem 7 is made up of five parallel cylinders approximately 1 ½" (3.8 cm) in diameter and 21" (53.3 cm) long packed full of a measured amount of wood sawdust. The length of each cylinder is preferably greater than its diameter, with an operable range of the ratio of length to diameter from 1.1:1 to 50:1, a preferred range from 2:1 to 25:1, and an optimal range from 10:1 to 16:1.

The sawdust packed in this highly oxygen restricted closed system retort is combusted by heating the cylinders with the natural gas burner 9 to an operable temperature range of 400 to 950 degrees Fahrenheit (204 to 510 degrees centigrade), a preferred range of 500 to 800 degrees Fahrenheit (260 to 571 degrees Centigrade), and an optimal range of 650 to 750 degrees Fahrenheit (343 to 399 degrees centigrade). The thermostat 10 controls the combustion temperature.

The apparatus is highly duplicable and scalable with measured amounts of wood sawdust, ice, and activated carbon used in the smoke manufacturing apparatus described herein. The dimensions of the elements of the apparatus may vary proportionately with one another to create greater or lesser amounts of tasteless super-purified smoke. In other words, a proportionately larger or smaller smoke generator 1 with a greater or lesser number of retort cylinders 7, each of a larger or smaller diameter, filled with a greater or lesser amount of sawdust and super-purified by a larger or smaller filtering tower 2 will fill a proportionately larger or smaller temporary pressure pot storage chamber 3.

The combustion within the retort cylinders packed full of wood sawdust produces water vapor and the smoke emissions described in Table 2. Closing the vent to outside air produces a highly oxygen restricted environment where all of the sawdust is pyrolyzed completely and flows out of the smoke generator 1 towards the precipitation tower 2.

A percentage of the tar, moisture, and residue byproducts of the combustion condense as liquid immediately and flow into the residue condensation chamber 11 which is sealed at the bottom by the purge valve 12 until near the end of the process. This residue liquid acts as an interior barrier to ensure the air tightness of the system until valve 12 is opened for liquid draining and final air flushing of the system The precipitation tower 2 is preferably comprised of an approximately 12" long by ¾" diameter (30.5 cm×1.9 cm diameter) vertical intake pipe 13 with the last 6" (15.2 cm) perforated with approximately ⅛" diameter (0.32 cm) dispensing holes ¼" (0.64 cm) apart, a crushed ice filter 14 within a tapered and glass enclosed chamber 19, an activated carbon filter 21, two cloth filters 20, and a water and particulate residue reservoir 16.

This stage of the process substantially filters the phenols in both gaseous vapor and particulate phases to concentrations below recognition thresholds for odor and taste that impart a smoked flavor to the treated food. Such recognition thresholds vary with the olfactory and taste senses of each individual. We have determined empirically an operable range of less than 15.6 parts per million (ppm) of the phenolic fraction of the gaseous vapor phase of wood smoke for odor recognition, a preferred range of less than 10.4 ppm, and an optimal range of less than 5.2 ppm. We have further determined empirically an operable range of less than 11.7 ppm of the phenolic fraction of the particulate phase for odor recognition, a preferred range of less than 7.8 ppm, and an optimal range of less than 3.9 ppm.

With respect to taste recognition threshold of the phenolic gaseous vapor phase of wood smoke, we have determined an operable range of less than 4.5 ppm, a preferred range of less than 2.3 ppm, and an optimal range of less than 1.2 ppm. Lastly, we have determined an operable range for taste recognition threshold of the phenolic particulate phase of less than 2.1 ppm; a preferred range of less than 1.4 ppm: and an optimal range of less than 0.7 ppm.

Alternative methods described in the summary above can effectively accomplish this object. The preferred embodiment has been found to be the most efficient and cost effective method, in addition to its versatility and practicality due to the use of easily obtainable materials—sawdust, natural gas, ice, and activated carbon.

The length of the precipitation tower 2 is preferably greater than its width, with an operable ratio ranging from 1.1:1 to 30:1, a preferred ratio ranging from 2:1 to 15:1, and an optimal ratio ranging from 3:1 to 7:1. It is ideally positioned on a vertical axis with an operable angle of less than 50 degrees from vertical, a preferred angle of less than 25 degrees from vertical, and an optimal angle less than 10 degrees from vertical.

Within the precipitation tower 2, the smoke flows out the perforated holes and upwards through the crushed ice filter 14. This tapered and glass enclosed ice chamber is approximately 42" long (106.7 cm) and has a 9" (22.9 cm) substantially square cross section at the bottom increasing to a 12" (30.5 cm) substantially square cross section at the top. A screen 15 acts as an ice shelf and as an outlet for the water and particulate residue. The ice chamber 19 is enclosed with glass to visually monitor that the smoke is flowing evenly through the ice turning it a consistent yellow as the desired reaction occurs.

The ratio of smoke that can be super-purified by each batch of ice is in an operable range of 1:1 to 20:1, a preferable range of 2:1 to 10:1, and an optimal range of 3:1 to 6:1.

The ice chamber 19 tapering proportions have been developed to the presently preferred relative dimensions through experimentation. The smaller cross section at the bottom is necessary to ensure that the smoke flows evenly through the ice. Although the ice chamber 19 will work most of the time with no taper and equal dimension cross sections at the bottom and top, problems may arise where the smoke adheres to the side walls and develops flow channels that avoid the cleansing reaction and even penetration of the smoke through the ice mass.

Therefore, the angle of the sides of the ice chamber 19 relative to its vertical axis is in an operable range of 0 to 50 degrees, a preferred range of 1 to 25 degrees, and an optimal range of 2 to 10 degrees.

When the smoke reacts with the ice 14, it turns a portion into water vapor and a portion into water. This water vapor saturates the smoke creating a "steamified" smoke rising in the tower. A portion of this "steamified" smoke then precipitates down as a "rains washing a large amount of particulate matter from the smoke and passing through to the water and particulate residue reservoir 16 which comprises approximately 18" (45.7 cm) below the ice chamber 19 at the bottom of the tower 2. This reservoir can be drained after the process is complete through drain valve 17.

The humidity of the smoke is increased as it blends with the water vapor produced in the precipitation tower 2. This humidity saturates and moistens the remaining particulate matter in the smoke increasing the particulate average size, weight, and adhesiveness and making it easier to filter as the smoke rises in the precipitation tower 2. In addition, oxidation of a portion of the natural gas components of the smoke occurs in this step with $CO_2$ increasing and CO decreasing approximately ten percent.

The smoke partially filtered by the ice and condensing water vapor next passes through a screen 18 at the bottom of the cloth 20, activated carbon 21, and cloth 20 filters to remove some of the water vapor and adsorb and absorb microscopic taste imparting and carcinogenic particulate and gaseous vapor compounds listed in Table 2. The screen 18 serves as intake to this stage of the filtering process and also as a shelf to support these filters.

For loading and maintenance of the precipitation tower 2, the sections can be disassembled, cleaned and refilled with new ice, cloth, and activated carbon for each cycle of the process. This batch process for the manufacturing of the super-purified smoke is necessary to replenish the filtering materials.

The temporary pressure pot storage chamber 3 is comprised of a 15 gallon pot 31, a rubber "O" ring seal 32 between the lid and the pot, intake valve 30, outlet valve 34, and an inner collapsible accordion bladder with absorbent liner pad 33 which expands down and contracts up inside the pot 31. A series of smoke sensors, flow meters, valves, exhaust pipes, and pumps control the flow of the tasteless super-purified smoke from the precipitation tower 2 into the temporary pressure pot storage chamber 3.

Prior to combusting the wood sawdust in the retort, the temporary pressure pot 31 is evacuated by a two way vacuum pump 28 drawing the inner collapsible accordion bladder up to the top of the pot 31. This is accomplished by isolating the temporary pressure pot storage chamber 3 from the earlier stages of the system by closing three way valve 26 in the direction of the precipitation tower 2 and opening it in the directions of the outside environment and of the temporary pressure pot 31. The valve to the outside environment 27 is opened, the intake valve 30 is opened, and the outlet valve 34 is closed. Air is pumped out to the atmosphere with pump 28 until pressure gauge 29 indicates that approximately 90% of the air has been evacuated and the accordion bladder 33 collapses towards the top of the pressure pot 31. Then valves 27 and 30 are closed to contain the vacuum holding up the collapsed bladder 33 in the temporary pressure pot storage chamber 3.

The temporary pressure pot storage chamber 3 is equal in size to the volume of sufficiently concentrated smoke produced by the smoke generator 1. The storage chamber 3 remains at the slightly evacuated pressure with its inner bladder 33 collapsed until the smoke passing through the precipitation tower 2 reaches a desired concentration and flow as indicated by the smoke sensor 21 and the flow meter 22 in the line.

The smoke is pumped out the exhaust pipe 24 by pump 23 with three way valve 25 open in the exhaust and precipitation tower 2 directions and closed in the temporary storage chamber 3 direction until the smoke reaches the desired concentration and flow. At this time, valve 25 closes the exhaust pipe 24, valve 26 opens the pipe in the direction of the storage chamber 3, and valve 30 opens to allow the smoke to naturally flow to the reduced pressure temporary storage chamber 3 with its inner bladder 33 expanding. As long as the concentration and flow levels as measured by the smoke sensor 21 and the flow meter 22 meet or exceed the minimum desired, the smoke flows on its own.

When the smoke falls below the prescribed levels, the purge valve 12 opens, the liquid residue drains, and flush air is allowed to enter the system. At the same time, the two way pump 28 begins pumping the remaining smoke in the system into the pressure pot storage chamber 3. This pump 28 turns off when the smoke sensor 21 indicates the system has been flushed and valve 30 is closed to contain the smoke in the inner bladder 33 of the temporary pressure pot 31 in a slightly pressurized state in an operable range of 37 to 107 psi (2.58 to 7.45 kg per square centimeter) and a preferred range of 52 to 72 psi (3.62 to 5.01 kg per square centimeter).

The inner accordion bladder 33 of the temporary pressure pot storage chamber 3 is preferably lined with absorbent material to absorb remaining flavor imparting gaseous vapor or particulate phase phenols, and any other remaining carcinogens, in the smoke as they settle.

This settling step of aging the smoke for treatment directly from the inner accordion bladder 33 has an operable range of one hour to 72 hours, a preferable range of 12 hours to 60 hours, and an optimal range of 24 hours to 48 hours. Aging the smoke for treatment at another time or place from storage canisters 40 has an operable range of greater than one hour, a preferable range of one week to one year, and an optimal range of two weeks to six months.

The shorter preferable aging time range for smoke directly from the inner accordion bladder 33 is a function of practical process design efficiencies. The longer preferable aging time range for smoke in storage canisters 40 is a function of the further reduction of flavor imparting phenols which lose potency due to decomposition and chemical reaction with other compounds over time. This longer aging time range in storage canisters 40 has an upper limit of preferably one year or less due to a reduction of beneficial phenols over time which contribute to the preservative effect on the seafood.

This substantially tasteless, super-purified smoke may now be used for the immediate treatment of seafood shown in FIG. 2 (b) flush treatment plastic bag subsystem, or stored in canisters as shown in FIG. 2 (c).

If immediate treatment is desired, whole small fish may be used, or each whole tuna or other seafood species is filleted, generally into four loins, and then a percentage is filleted into sashimi slices and a percentage is filleted into tuna or other seafood steaks. Seafood needs to be kept chilled during the filleting process to avoid spoilage. Therefore, the fish are kept chilled at temperatures immediately above their freezing points which vary from fish to fish as a function of the salt content of the meat. Such freezing points can be as low as 27 degrees Fahrenheit (−2 degrees Centigrade). The operable range is between the fish's freezing point and ten degrees greater than its freezing point; the preferred range is between its freezing point and five degrees greater than its freezing point; and the optimal range is between its freezing point and two degrees greater than its freezing point.

Each sashimi slice is next placed in a dipping solution to stabilize color, enhance flavor and firm the texture of the sashimi. This added step of dipping is used for sashimi slices and not for tuna steaks, since the enhanced flavor is noticeable when the sashimi slices are thawed and eaten raw and would not be noticeable for cooked tuna steaks.

As shown in FIG. 2 (b), the filleted and dipped sashimi slices or the filleted tuna steaks 37 are placed in plastic bags 36. The air in each bag 36 is removed and a hose with dispensing nozzle 35 from the pressure pot 31 are inserted. The hose with dispensing nozzle 35 has a control at the dispensing point similar to the air nozzles for tires at gas stations. If pressures above 40 psi (2.79 kg per square centimeter) are used a regulator is also required.

The outlet valve 34 to the temporary storage chamber 3 is opened and the hose with dispensing nozzle control 35 is inserted in a plastic bag 36 and opened to flush the seafood with a volume of tasteless super-purified smoke with the gaseous vapor and particulate phenol concentrations below both the odor and taste recognition thresholds cited above. Most smoking processes have a continuous flow of smoke passing in contact with the seafood or meat. The process described herein limits the amount of smoke and as a result minimizes the total amount of flavor imparting phenols remaining in the smoke that come in contact with the seafood or meat.

The volume of tasteless super-purified smoke that flushes the seafood is in an operable range of the ratio of volume of smoke to seafood of 0.05:1 or greater; in a preferred range from 1:1 to 100:1; and in an optimal range from 1.5:1 to 20:1. When sufficient smoke is dispensed, the dispensing control nozzle 35 is closed, the outlet valve 34 is closed and the plastic bag 36 is sealed.

Desired penetration of the super-purified smoke in the seafood is achieved in an operable range from 1 second to 60 hours; a preferred range of 12 hours to 54 hours; and an optimal range of 24 to 48 hours. This treatment period is an additional period of aging the smoke as the flavor imparting phenols continue to lose potency. Empirical evidence indicates the treatment time to achieve the desired penetration varies with the seafood to be treated. In addition, the minimum temperature during treatment varies with the type of seafood being treated and is approximately 0.2 degrees Fahrenheit (0.1 degree Centigrade) above its variable freezing point.

Therefore, the treatment temperature is an operable range from 0.2 degree Fahrenheit (0.1 degree Centigrade) above the variable seafood freezing point to 46 degrees Fahrenheit (7.8 degrees Centigrade), a preferred range from 0.2 degree Fahrenheit (0.1 degree Centigrade) above the variable seafood freezing point to 38 degrees Fahrenheit (3.4 degrees Centigrade), and an optimal range from 0.2 degree Fahrenheit (0.1 degree Centigrade) above the variable seafood freezing point to 35 degrees Fahrenheit (1.7 degrees Centigrade).

Desired penetration of the super-purified smoke in the seafood is achieved while imparting total phenols from both gaseous vapor and particulate phases at concentrations below flavor and aroma recognition thresholds into the seafood. The phenol levels within the treated product are of concern here, whereas the phenol levels within the wood smoke are of concern during the super-purifying filtering process. Such recognition thresholds of phenols within the treated product also vary with the olfactory and taste senses of each individual. We have determined empirically an operable range of less than 14.1 parts per million (ppm) of total phenol weight per total weight of seafood, a preferred range of less than 9.4 ppm, and an optimal range of less than 4.7 ppm.

If treatment at another time and/or place is desired a compressor 38 as shown in FIG. 2 (c) is preferably attached to the outlet hose from the pressure pot 31 with its expandable inner bladder, or directly to the outlet of the precipitation tower 2 in an abbreviated process. In the preferred embodiment the outlet valve 34 is opened and the tasteless super-purified smoke is compressed and pumped through the pressure valve/gauge 39 into the canister 40 to a desired pressure in an operable range of 200 to 2,500 psi (13.9 to 174.1 kg per square centimeter) and a preferred range of 1,800 to 2,200 psi (125.4 to 153.2 kg per square centimeter). Then the outlet valve 34 and the pressure valve 39 are closed.

Each canister 40 can be used at a future time and place with a delivery system consisting of a regulator and a hose with dispensing nozzle 35 which is attached to an evacuated plastic bag 36 filled with filleted seafood 37 as described in FIG. 2 (b). The pressure valve 39 is opened and the regulator regulates the flow rate into the bag 36 until the ratio of the volume of tasteless super-purified smoke to seafood being treated is in an operable range of 0.05:1 or greater, a preferred range of 1:1 to 100:1; and an optimal range of 1.5:1 to 20:1 with the gaseous vapor and particulate phenol concentrations below both the odor and taste recognition thresholds cited above. When sufficient smoke is dispensed, the pressure valve 39 is closed and the bag 36 is sealed.

The treated seafood is next stored as described above for an operable range from 1 second to 60 hours; a preferred range of 12 hours to 54 hours; and an optimal range of 24 to 48 hours, or until the desired penetration of tasteless super-purified smoke into the fish is complete.

After treatment is complete, each bag 36 is opened and emptied and the seafood is repackaged preferably with an absorbent material in a semi-permeable vacuum pouch. The absorbent material absorbs excess moisture lost during freezing and thawing and prevents the seafood from soaking in such liquid resulting in a texture similar to fresh product after thawing.

The vacuum packed pouches are next frozen at an operable range of 10 degrees Fahrenheit or less (−12 degrees Centigrade or less), a preferred range of −40 degrees Fahrenheit or less (−40 degrees Centigrade or less), and an optimal range of cryogenic freezing of −76 degrees Fahrenheit or less (−60 degrees Centigrade or less). The frozen pouches can then be stored at an operable range of 25 degrees Fahrenheit or less (−4 degrees Centigrade or less), a preferred range of −10 degrees Fahrenheit or less (−23 degrees Centigrade or less, and an optimal range of −40 degrees Fahrenheit or less (−40 degrees Centigrade or less) for up to one year optimally without losing their vitality characteristics of freshness, flavor, color, and moisture retention after thawing.

Preferably, five pouches of tuna steaks of approximately 5.0 pounds (2.27 kilograms) each or 10 pouches of sashimi of approximately 2.2 pounds (1.0 kilogram) each are packed in master shipping cartons which are waxed or treated with a water resistant coating to prevent deterioration. Within each carton layers of cushioning material are placed between the packaged seafood to cushion the layers of product.

The quick thawing procedure is identical for frozen sashimi slice or steak pouches. The retailer, restaurant, or sushi bar thaws only enough for immediate sale by preparing a solution of cold water and one tablespoon of salt per gallon of cold water for each pouch to be thawed. The salt prevents discoloration if the meat contacts the solution which is in an operable range of 33 to 65 degrees Fahrenheit (1 to 18 degrees Centigrade), a preferred range of 40 to 50 degrees Fahrenheit (4 to 10 degrees Centigrade), and an optimal temperature of 45 degrees Fahrenheit (7 degrees Centigrade).

Each pouch of approximately 5.0 pounds (2.27 kilograms) of seafood steaks is submersed for approximately fifty minutes or until partially thawed with the pieces inside easily separated. Each pouch of approximately 2.2 pounds (1.0 kilogram) of sashimi slices requires approximately twenty-five minutes of quick thawing. Each pouch is then removed from the solution and dried with a paper towel. The vacuum pouch is then cut open, the sashimi slices or steaks towel dried if necessary, and displayed for sale in a refrigerated seafood section or prepared for sale in a restaurant or sushi bar.

The slow thawing procedure involves leaving the vacuum pouch in a refrigerator in an operable range of 33 to 50 degrees Fahrenheit (1 to 10 degrees Centigrade), a preferred range of 35 to 40 degrees Fahrenheit (2 to 4 degrees Centigrade), and an optimal temperature of 37 degrees Fahrenheit (3 degree Centigrade) for twelve hours or longer. The semi-permeable vacuum pouch is designed to allow oxygen to permeate into the pouch after partial thawing as its plastic becomes more malleable. This slight thawing begins normal decomposition of the seafood. This is a safety feature for both the retailer and the consumer. If the product is left in the pouch after thawing for too long, or if it is abused by temperatures above the operable range, then the normal signs of decomposition and spoilage, such as developing a bad smell, will occur similar to fresh product.

Thus, the present process for manufacturing tasteless super-purified smoke or treating seafood meets the objectives of preserving the vitality characteristics of freshness, color, texture, natural flavor, moisture retention, and shelf life of the seafood, particularly after it is frozen and thawed. In addition, the tasteless super-purified smoke, which can be stored and transported in canisters 40, greatly reduces equipment and facility costs enabling low cost treatment of seafood to be convenient and affordable throughout the seafood industry.

Industrial Applicability

This invention can be used to treat varying types of tuna species and other seafood containing red color flesh that would tend to turn brown after being frozen and thawed without this treatment. Although this tasteless super-purified smoke is primarily intended to be used to treat seafood it can also be used with meat and poultry.

What is claimed is:

1. A process for treating meat comprising:
heating organic material to generate smoke having a gaseous vapor phase;

super purifying said smoke to reduce taste imparting components below thresholds for imparting smoke odor and taste, whereby a substantially tasteless super-purified smoke is created; and treating meat having a freezing point with said tasteless super-purified smoke.

2. A process according to claim 1, wherein said treating step occurs for between approximately 1 second and approximately 60 hours, at a temperature between approximately 0.2 degrees Fahrenheit (0.1 degrees Centigrade) above said meat's freezing point, and approximately 46 degrees Fahrenheit (7.8 degrees Centigrade).

3. A process according to claim 2, further comprising:

freezing said treated meat for storage, whereby frozen meat is created.

4. A process according to claim 2 or 3, wherein said treating step occurs at a temperature between approximately 0.2 degrees Fahrenheit (0.1 degrees Centigrade) above said meat's freezing point, and approximately 38 degrees Fahrenheit (3.4 degrees Centigrade).

5. A process according to claim 2 or 3, wherein said treating step occurs at a temperature between approximately 0.2 degrees Fahrenheit (0.1 degrees Centigrade) above said meat's freezing point, and approximately 35 degrees Fahrenheit (1.7 degrees Centigrade).

6. A process according to any one of claims 1 to 3, wherein said treating step is carried out for between approximately 12 hours and approximately 54 hours.

7. A process according to any one of claims 1 to 3, wherein said treating step is carried out for between approximately 24 hours and approximately 48 hours.

8. A process according to claim 3, wherein said freezing step occurs at a temperature of at most approximately 10 degrees Fahrenheit (−12 degrees Centigrade).

9. A process according to claim 3, wherein said freezing step occurs at a temperature of at most approximately −40 degrees Fahrenheit (−40 degrees Centigrade).

10. A process according to claim 3, wherein said freezing step occurs at a temperature of at most approximately −76 degrees Fahrenheit (−60 degrees Centigrade).

11. A process according to any one of claims 1 to 3, wherein said heating step generates smoke also having a particulate phase, further comprising:

filtering the particulate phase of said smoke to eliminate tar, moisture, particulate and other solid matter residue after said heating step.

12. A process according to claim 11, further comprising:

filtering the gaseous vapor phase of said smoke to eliminate any remaining odor and taste imparting gaseous vapor compounds and phenols.

13. A process according to any one of claims 1 to 3, wherein said super purifying step is carried out by reducing phenols in said smoke to concentrations below recognition thresholds for imparting smoke odor to said meat.

14. A process according to claim 13, wherein said super purifying step is carried out until the gaseous vapor phase of said super purified smoke contains less than approximately 15.6 parts per million of aromatic phenols.

15. A process according to claim 13, wherein said super purifying step is carried out until the gaseous vapor phase of said super purified smoke contains less than approximately 10.4 parts per million of aromatic phenols.

16. A process according to claim 13, wherein said super purifying step is carried out until the gaseous vapor phase of said super purified smoke contains less than approximately 5.2 parts per million of aromatic phenols.

17. A process according to claim 11, wherein said super purifying step is carried out until the particulate phase of said super purified smoke contains less than approximately 11.7 parts per million of aromatic phenols.

18. A process according to claim 11, wherein said super purifying step is carried out until the particulate phase of said super purified smoke contains less than approximately 7.8 parts per million of aromatic phenols.

19. A process according to claim 11, wherein said super purifying step is carried out until the particulate phase of said super purified smoke contains less than approximately 3.9 parts per million of aromatic phenols.

20. A process according to claim 13, wherein said treating step is carried out so that said meat contains less than 14.1 parts per million of total aromatic phenols by weight per total weight of the meat.

21. A process according to claim 13, wherein said treating step is carried out so that said meat contains less than 9.4 parts per million of total aromatic phenols by weight per total weight of the meat.

22. A process according to claim 13, wherein said treating step is carried out so that said meat contains less than 4.7 parts per million of total aromatic phenols by weight per total weight of the meat.

23. A process according to any one of claims 1 to 3, further comprising:

aging said smoke for more than one hour before said treating step.

24. A process according to claim 3, further comprising:

storing said frozen meat at a temperature of at most 25 degrees Fahrenheit (−4 degrees Centigrade) for up to one year; and thawing said meat, whereby said meat retains vitality after said thawing step.

25. A process according to claim 3, further comprising:

storing said frozen meat at a temperature of at most −10 degrees Fahrenheit (23 degrees Centigrade) for up to one year; and thawing said meat, whereby said meat retains vitality after said thawing step.

26. A process according to claim 3, further comprising:

storing said frozen meat at a temperature of at most −40 degrees Fahrenheit (−40 degrees Centigrade) for up to one year; and thawing said meat, whereby said meat retains vitality after said thawing step.

27. A process according to any one of claims 1 to 3, wherein said treating step is carried out to prevent smoke odor or taste from being imparted to said meat while preserving said meat, whereby said meat tastes fresh, without smoke odor or taste from said smoke, when said meat is thawed and eaten raw.

28. A process according to any one of claims 1 to 3, wherein said treating step is carried out by injecting said super purified smoke into said meat.

29. A process according to any one of claims 1 to 3, further comprising:

compressing said tasteless super purified smoke after said super purifying step; and storing said compressed tasteless super purified smoke in canisters.

30. A process according claim 29, wherein said treating step is carried out with said compressed tasteless super-purified smoke.

31. A process according to claim 29, wherein said compressed tasteless super purified smoke is compressed and stored in a canister at a pressure range of approximately 200 pounds per square inch (13.9 kilograms per square centimeter) to approximately 2,500 pounds per square inch (174.1 kilograms per square centimeter).

32. A process according to claim 29, wherein said compressed tasteless super purified smoke is compressed and stored in a canister at a pressure range of approximately 1,800 pounds per square inch (125.4 kilograms per square centimeter) to approximately 2,200 pounds per square inch (153.2 kilograms per square centimeter).

33. A process according to any one of claims 1 to 3, wherein said heating step is carried out by heating said organic material at between approximately 400 degrees Fahrenheit (204 degrees Centigrade) and approximately 950 degrees Fahrenheit (510 degrees Centigrade).

34. A process according to any one of claims 1 to 3, wherein said heating step is carried out by heating said organic material at between approximately 500 degrees Fahrenheit (260 degrees Centigrade) and approximately 800 degrees Fahrenheit (571 degrees Centigrade).

35. A process according to any one of claims 1 to 3, wherein said heating step is carried out by heating said organic material at between approximately 650 degrees Fahrenheit (242 degrees Centigrade) and approximately 750 degrees Fahrenheit (399 degrees Centigrade).

36. A process according to any one of claims 1 to 3, further comprising:
aging said tasteless super purified smoke for 1 week to 1 year prior to said treating step.

37. A process according to any one of claims 1 to 3, further comprising:
aging said tasteless super purified smoke for from 2 weeks to 6 months prior to said treating step.

38. A process according to any one of claims 1 to 3, wherein said treating step comprises exposing said meat to tasteless super purified smoke, and said treating step is carried out until penetration of said tasteless super purified smoke into said meat is complete enough to maintain vitality after said meat is frozen and thawed.

39. A process according to any one of claims 1 to 3, wherein said treating step limits the quantity of said tasteless super purified smoke exposed to said meat, whereby the total amount of said flavor imparting components exposed to said meat is minimized to prevent imparting smoke flavor or odor to said meat.

40. A process according to claim 39, wherein said treating step uses said tasteless super purified smoke in a ratio of at least approximately 0.05:1 of volume of said tasteless super purified smoke to volume of meat.

41. A process according to claim 39, wherein said treating step uses said tasteless super purified smoke in a ratio of approximately 1:1 to approximately 100:1 of volume of super purified smoke to volume of meat.

42. A process according to claim 39, wherein said treating step uses said tasteless super purified smoke in a ratio of approximately 1.5:1 to approximately 20:1 of volume of super purified smoke to volume of meat.

43. A process according to any one of claims 1 to 3, wherein said treating step is carried out by flooding a smoke treatment chamber containing said meat with said tasteless super purified smoke.

44. A process according to any one of claims 1 to 3, wherein said smoke generation and super purification steps are carried out at a different time and place than said treating step.

45. A process according to any one of claims 1 to 3, wherein said super purifying step is carried out using a precipitation tower.

46. A process according to any one of claims 1 to 3, wherein said treating step smokes said meat with said super purified smoke, without imparting a smoky taste to said meat.

47. A process according to any one of claims 3, 8, 9, or 10, wherein said frozen meat is thawed in a refrigerator at a temperature between approximately 33 degrees Fahrenheit (1 degree centigrade) and approximately 50 degrees Fahrenheit (10 degrees centigrade).

48. A process according to any one of claims 3, 8, 9, or 10, wherein said frozen meat is thawed in cold water at a temperature between 33 degrees Fahrenheit (1 degree centigrade) and approximately 65 degrees Fahrenheit (18 degrees centigrade).

49. A process for treating meat, comprising:
heating organic material to generate smoke containing smoke taste compounds;
super purifying said smoke by eliminating said smoke taste compounds from said smoke; and
treating meat with said smoke, whereby said treated meat does not have a smoky taste.

50. A process for treating meat comprising:
heating organic material to generate smoke, wherein said smoke contains taste compounds;
super purifying said smoke by eliminating smoke taste compounds from said smoke;
treating meat with said smoke; and
whereby said treated meat does not retain a smoky taste.

51. A process according to any one of claims 1, 2, 3, 49, or 50, wherein said super purifying step is carried out using a molecular sieve filter.

52. A process according to any one of claims 1, 2, 3, 49, or 50, wherein said super purifying step is carried out using an adsorbent filter.

53. A process according to any one of claims 1, 2, 3, 49, or 50, wherein said super purifying step is carried out using a water filter.

54. A process according to any one of claims 1, 2, 3, 49, or 50, wherein said super purifying step is carried out using an absorbent filter and an adsorbent filter.

55. A process according to any one of claims 1, 2, 3, 49 or 50, wherein said super purifying step is carried out using a water filter, an adsorbent filter, and an absorbent filter.

56. A process according to any one of claims 1, 2, 3, 49 or 50, wherein said treating step fixes red meat color.

57. A process according to claim 56, wherein said meat with said fixed red meat color contains carboxymyoglobin concentrations at least 50% higher than untreated meat; and
said red meat color remains fixed at a temperature at most −4 degrees Fahrenheit (−20 degrees Centigrade) for up to one year.

58. A process according to claim 57, wherein said meat is fresh, raw, and abundant in vital cells.

59. A process according to any one of claims 1, 2, 3, 8, 9, 10, 24, 25, 26, 49 or 50, wherein said meat comprises seafood.

60. A process for treating seafood comprising:
burning organic material to create smoke;
condensing tar, moisture and particulate residue out of said smoke;
super purifying said smoke to reduce taste and odor imparting particulates and vapors below taste and odor recognition thresholds, thereby creating a tasteless super purified smoke;
aging said tasteless super purified smoke for between approximately one hour and approximately 72 hours;

treating seafood having a freezing point with said aged tasteless super purified smoke at a temperature between approximately 0.2 degrees Fahrenheit (0.1 degrees Centigrade) above said freezing point and approximately 46 degrees Fahrenheit (7.8 degrees Centigrade) for between approximately 1 second and approximately 60 hours;

freezing said seafood for storage at a temperature of at most approximately 10 degrees Fahrenheit (−12 degrees Centigrade); and storing said seafood at a temperature of at most approximately 25 degrees Fahrenheit (−4 degrees Centigrade) for at most approximately 1 year.

61. A process according to claim 60, wherein said freezing step is carried out at a temperature of at most approximately −40 degrees Fahrenheit (−40 degrees Centigrade).

62. A process according to claim 60, wherein said freezing step is carried out at a temperature of at most approximately −76 degrees Fahrenheit (−60 degrees Centigrade).

63. A process for treating seafood, comprising:

heating sawdust to create smoke;

condensing tar, moisture and particulate residue out of said smoke, super purifying said smoke to reduce particulate and vapor phenols below taste and odor recognition thresholds, thereby creating a tasteless super purified smoke;

aging said tasteless super purified smoke for between approximately 12 hours to approximately 60 hours;

filleting seafood, shaving a freezing point, at a temperature between said freezing point and approximately five degrees greater than said freezing point to form fillets;

placing said fillets in treatment chambers;

flushing said fillets with said tasteless super purified smoke at a temperature between approximately 0.2 degrees Fahrenheit (0.1 degrees Centigrade) above said freezing point and approximately 46 degrees Fahrenheit (7.8 degrees Centigrade) for between approximately 1 second and approximately 60 hours;

freezing said seafood for storage at a temperature of at most approximately 10 degrees Fahrenheit (−12 degrees Centigrade); and storing said seafood at a temperature of at most approximately 25 degrees Fahrenheit (−4 degrees Centigrade).

64. A process according to claim 60 or 63, wherein said super-purifying step removes microscopic particulate and gaseous vapor compounds remaining in said smoke that impart smoked flavor to foods.

65. A process according to claim 60 or 63, wherein said frozen super purified smoke treated seafood is thawed in a refrigerator at a temperature between 33 degrees Fahrenheit (1 degree centigrade) and approximately 50 degrees Fahrenheit (10 degrees centigrade).

66. A process according to claim 60 or 63, wherein said frozen super purified smoke treated seafood is thawed in cold water at a temperature between approximately 33 degrees Fahrenheit (1 degree centigrade) and approximately 65 degrees Fahrenheit (18 degrees centigrade).

67. A process for treating food comprising:

heating organic material to generate smoke;

filtering components that impart smoke flavor from said smoke to below limits for imparting smoke flavoring to food; and exposing said filtered smoke to food without imparting a smoke flavor to said food.

68. A process for treating food comprising:

heating organic material to generate smoke;

removing components that impart smoke odor from said smoke; and exposing food to said smoke, whereby the quantity of smoke odor imparting components removed from said smoke is adequate to prevent imparting a smoke odor to said food.

69. A process for treating food comprising:

heating organic material to generate smoke that contains a vapor phase having smoke odor and flavor imparting components;

filtering said smoke to remove a portion of said smoke odor and flavor imparting components;

exposing food to said filtered smoke so as to prevent smoke flavoring of said food by reducing the quantity of said filtered smoke exposed to said food.

70. A process according to one of any claims 1, 2, 3, 49, or 50, wherein said heating step combusts said organic material.

71. A process according to one of any claims 1, 2, 3, 49, or 50, wherein said heating step pyrolyses said organic material.

72. A process according to one of any claims 1, 2, 3, 49, or 50, wherein said heating step burns said organic material.

73. A process according to one of any claims 1, 2, 3, 49, or 50, wherein said heating step thermally decomposes said organic material.

* * * * *

(12) EX PARTE REEXAMINATION CERTIFICATE (7872nd)
United States Patent
Kowalski

(10) Number: US 5,972,401 C1
(45) Certificate Issued: Nov. 16, 2010

(54) PROCESS FOR MANUFACTURING TASTELESS SUPER-PURIFIED SMOKE FOR TREATING SEAFOOD TO BE FROZEN AND THAWED

(75) Inventor: William R. Kowalski, Honolulu, HI (US)

(73) Assignee: Leo Sandau, Honolulu, HI (US)

Reexamination Request:
No. 90/009,448, Apr. 22, 2009

Reexamination Certificate for:
Patent No.: 5,972,401
Issued: Oct. 26, 1999
Appl. No.: 08/980,392
Filed: Nov. 28, 1997

Related U.S. Application Data

(63) Continuation-in-part of application No. 08/733,844, filed on Oct. 18, 1996, now abandoned.
(60) Provisional application No. 60/040,731, filed on Mar. 12, 1997.

(51) Int. Cl.
*A23L 1/226* (2006.01)
*A23L 1/232* (2006.01)
*A23B 4/044* (2006.01)
*A23B 4/006* (2006.01)
*A23B 4/008* (2006.01)

(52) U.S. Cl. .................... 426/314; 426/315; 426/486; 426/524; 426/478
(58) Field of Classification Search .................. None
See application file for complete search history.

(56) References Cited

U.S. PATENT DOCUMENTS

| | | | |
|---|---|---|---|
| 1,939,949 A | 12/1933 | Bertram | |
| 3,347,245 A | 10/1967 | Kawkins | |
| 3,351,071 A | 11/1967 | Belfort | |
| 4,522,835 A | 6/1985 | Woodruff | |
| 5,484,619 A | 1/1996 | Yamaoka | |

OTHER PUBLICATIONS

William McPherson & William Edwards Henderson, A Course in General Chemistry 2nd edition, (2nd ed. 1921) p. 416–421, Publisher: Ginn and Company, USA.
W. J. Atkinson Butterfield, Gas Manufacture: The Chemistry Of., (vol. 1., 1896). p. 1–120, Publsiher: Charles & Compnay Limited, London.
Samuel Hughes, A Treatise on Gas–Works: Manufacturing and Distributing Coal Gas, (1853) p. 1–203, Publsiher: Na, London.
The PescaRich Publication distributed at the 1995 SeaFare Show in Long Beach California, USA.
The PescaRich Publication distributed in 1996 in the USA.
The Nakamatsu Publication and translation distributed in 1994 in Japan.

*Primary Examiner*—Jerry D. Johnson

(57) ABSTRACT

Tasteless super-purified smoke is manufactured to treat seafood and meat to preserve the freshness, color, texture, and natural flavor, particularly after the food is frozen and thawed. The smoke is generated by burning an organic smoking material at preferably 500 to 800 degrees F. (260 to 571 degrees C.) in a smoke generator 1. It is then passed through a precipitation filtering tower 2 comprised of filters of ice, cloth, and activated carbon to remove taste imparting, and carcinogenic, particulates and vapors. The super-purified smoke is then stored and aged in a temporary pressure pot 3 or in canisters for treatment at the same time or at another place and time. The super-purified smoke is used to treat seafood or meat in plastic bags at temperatures between its variable freezing point and 46 degrees F. (7.8 degrees C.) for twelve to forty-eight hours, or until the desired effect is achieved. The product is then frozen, stored for up to one year, and quick or slow thawed with little degradation of the treated seafood or meat.

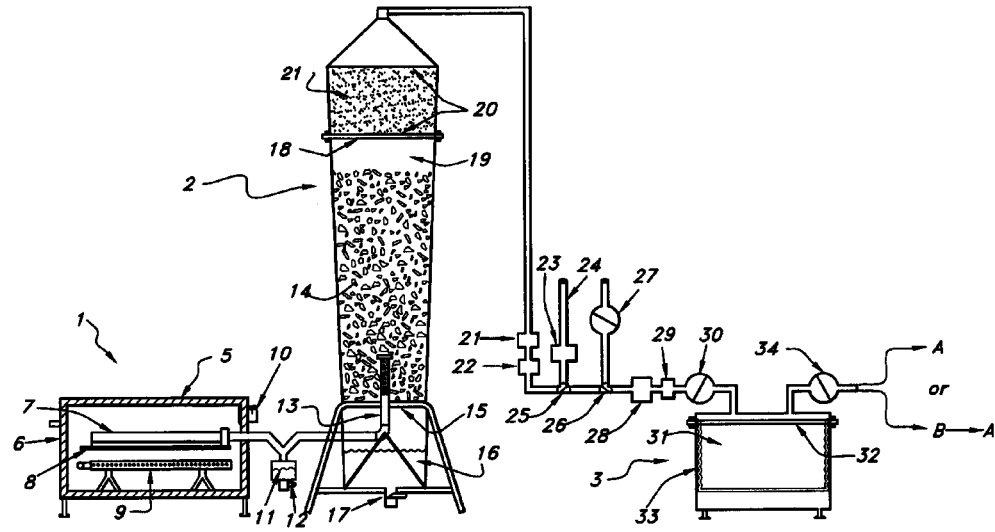

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 67 are cancelled.

New claims 74 and 75 are added and determined to be patentable.

Claims 2-66 and 68-73 were not reexamined.

*74. A process for treating meat comprising:*
*heating organic material to generate smoke having a gaseous vapor phase;*
*super purifying said smoke to reduce taste imparting components below thresholds for imparting smoke odor and taste, whereby a substantially tasteless super-purified smoke is created; and*
*treating meat having a freezing point with said tasteless super-purified smoke;*
*wherein said super purifying step is performed using an activated carbon filter to adsorb phenols to concentrations below odor and taste recognition thresholds for imparting a smoked flavor to the treated meat;*
*whereby said treated meat does not have a smoked flavor.*

*75. A process for treating food comprising:*
*heating organic material to generate smoke;*
*filtering components that impart smoke flavor from said smoke to below limits for imparting smoke flavoring to food; and*
*exposing said filtered smoke to food without imparting a smoke flavor to said food;*
*wherein said filtering step is performed using an activated carbon filter to adsorb phenols to concentrations below odor and taste recognition thresholds for imparting a smoked flavor to the treated meat;*
*whereby said treated food does not have a smoked flavor.*

\* \* \* \* \*